(12) United States Patent
Schumann

(10) Patent No.: US 11,320,524 B2
(45) Date of Patent: May 3, 2022

(54) METHOD FOR CALIBRATING ULTRASONIC TRANSDUCERS AND SYSTEM FOR CARRYING OUT THE METHOD

(71) Applicant: Robert Bosch GmbH, Stuttgart (DE)

(72) Inventor: Michael Schumann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 432 days.

(21) Appl. No.: 16/474,165

(22) PCT Filed: Jan. 23, 2018

(86) PCT No.: PCT/EP2018/051583
§ 371 (c)(1),
(2) Date: Jun. 27, 2019

(87) PCT Pub. No.: WO2018/141585
PCT Pub. Date: Aug. 9, 2018

(65) Prior Publication Data
US 2019/0324131 A1 Oct. 24, 2019

(30) Foreign Application Priority Data

Feb. 2, 2017 (DE) .......................... 102017201662.0
Jun. 22, 2017 (DE) .......................... 102017210481.3

(51) Int. Cl.
*G01S 7/52* (2006.01)
*G01S 7/521* (2006.01)
(Continued)

(52) U.S. Cl.
CPC .......... *G01S 7/52004* (2013.01); *G01S 7/521* (2013.01); *G01S 15/08* (2013.01); *G01S 15/931* (2013.01); *G01S 2015/938* (2013.01)

(58) Field of Classification Search
CPC ........ G01S 15/08; G01S 15/931; G01S 7/521; G01S 7/52004; G01S 2015/938
See application file for complete search history.

(56) References Cited

U.S. PATENT DOCUMENTS 8,991,256 B2 * 3/2015 Rudd ........................ G01P 5/18
73/597
9,628,762 B2 * 4/2017 Farritor ................ G06K 9/2036
(Continued)

FOREIGN PATENT DOCUMENTS

DE         4120397 A1    12/1992
DE   102006033693 A1     2/2007
(Continued)

OTHER PUBLICATIONS

International Search Report for PCT/EP2018/051583, dated Apr. 19, 2018.

*Primary Examiner* — Isam A Alsomiri
*Assistant Examiner* — Amie M Ndure
(74) *Attorney, Agent, or Firm* — Norton Rose Fulbright US LLP; Gerard Messina

(57) ABSTRACT

A method for calibrating ultrasonic transducers, the ultrasonic transducers being situated at known distances or at known ratios of the distances from one another, preferably in a bumper of a motor vehicle, and one of the ultrasonic transducers is operated in a transmission mode, and at least one other ultrasonic transducer is operated in a receiving mode.

14 Claims, 3 Drawing Sheets

(51) Int. Cl.
*G01S 15/08* (2006.01)
*G01S 15/931* (2020.01)

(56) References Cited

U.S. PATENT DOCUMENTS

| | | | | |
|---|---|---|---|---|
| 2007/0271014 A1* | 11/2007 | Breed | ............ | B60R 19/483 |
| | | | | 701/31.9 |
| 2007/0299587 A1* | 12/2007 | Breed | ............ | B60R 21/015 |
| | | | | 701/45 |
| 2008/0040005 A1* | 2/2008 | Breed | ............ | H01H 35/146 |
| | | | | 701/48 |
| 2008/0119966 A1* | 5/2008 | Breed | ............ | G08G 1/096758 |
| | | | | 701/2 |
| 2010/0111133 A1* | 5/2010 | Yuhas | ............ | G01K 11/24 |
| | | | | 374/30 |
| 2010/0207754 A1* | 8/2010 | Shostak | ............ | B60C 23/041 |
| | | | | 340/450 |

FOREIGN PATENT DOCUMENTS

| | | |
|---|---|---|
| DE | 102005052633 A1 | 5/2007 |
| DE | 102006032125 A1 | 1/2008 |
| DE | 102010027972 A1 | 10/2011 |
| DE | 102014224509 B3 | 12/2015 |
| JP | S628073 A | 1/1987 |
| JP | H1039017 A | 2/1998 |
| JP | 2005114722 A | 4/2005 |
| JP | 2010175536 A | 8/2010 |
| JP | 2011257379 A | 12/2011 |
| JP | 2015090284 A | 5/2015 |
| WO | 2016146292 A1 | 9/2016 |
| WO | WO-2016146292 A1 * | 9/2016 ........... G01S 15/003 |

* cited by examiner

METHOD FOR CALIBRATING ULTRASONIC TRANSDUCERS AND SYSTEM FOR CARRYING OUT THE METHOD

FIELD

The present invention relates to a method for calibrating ultrasonic transducers. Moreover, the present invention relates to a system for carrying out the method.

BACKGROUND INFORMATION

A method for calibrating ultrasonic transducers is described in German Patent No. DE 10 2014 224 509 B3. The described method is utilized for detecting the correct installation sites of ultrasonic transducers in the bumper of a motor vehicle. This means, whether an ultrasonic transducer intended for a certain installation site in a bumper is also actually installed at this site. For this purpose, the relevant ultrasonic transducer is operated in a transmission mode and the signal propagation time to an adjacent ultrasonic transducer is recorded. The recorded actual signal propagation time is compared to a setpoint signal propagation time which is to be expected in the case of a correct placement of the ultrasonic transducer which is situated at a certain distance from the ultrasonic transducer operated in the receiving mode. The correct installation situation of the individual ultrasonic transducers may be inferred on the basis of the comparison of various signal propagation times with ultrasonic transducers operated in the receiving mode. It is essential that the described method is utilized only for detecting the correct installation sites of the ultrasonic transducers in the bumper, but not for being able to detect and correct production- and/or operation-induced measuring inaccuracies of the ultrasonic transducers, which occur, in particular, due to a different transient response of the ultrasonic transducers or as a function of the operating temperature of the ultrasonic transducers.

In order to measure objects in the case of driver assistance systems of the type utilized, in particular, during parking maneuvers, a method of trilateration is utilized in order to determine the object position. The lateral accuracy of the detected distance to the object depends on the distance between the individual ultrasonic transducers and the accuracy of the echo distance measurement of the involved ultrasonic transducers. The greater the distance between the individual ultrasonic transducers, the more precise is the lateral localization of the object. If multiple objects are located in the detection range of the ultrasonic transducers, however, ambiguities occur, since the echo assignment of the ultrasonic transducers operated in the receiving mode to the individual objects is not known. It would therefore be desirable to place the ultrasonic transducers preferably close to one another and, therefore, reduce the aforementioned ambiguities. Moreover, a piece of vertical directional information for a height classification of a detected object is desirable. Typically, such a transducer is referred to as an angle-transmitting 3D transducer. If typical standard transducers are to be utilized instead of a so-called ultrasonic array which encompasses a plurality of transducers in a small space, a reduction of the distances between the ultrasonic transducers, which results in a reduction of the ambiguity in the detection of multiple objects, simultaneously results in a greater inaccuracy with respect to the lateral position of the object, however. It is therefore desirable to achieve a preferably high measuring accuracy, so that the ultrasonic transducers may be situated at a preferably close distance to one another. Measuring accuracies in the magnitude of 1 µs are typically necessary for this purpose. Present measuring accuracies are approximately 60 µs or higher, however. An essential factor for the measuring accuracy is the transient response of the ultrasonic transducer, which varies from ultrasonic transducer to ultrasonic transducer, for production-related reasons, and also depends on its operating temperature.

SUMMARY

An example method for calibrating ultrasonic transducers in accordance with the present invention may have the advantage that the measuring accuracy of the ultrasonic transducers may be increased. In particular, the method according to the present invention makes it possible to detect and compensate for production- and/or operation-induced differences between the individual ultrasonic transducers which are usually situated in the bumper. When the production- and/or operation-induced, individual behavior of the ultrasonic transducers is known, their relative measuring accuracy with respect to one another may therefore be adapted, and so an improved and more precise measurement of an object distance is made possible. This, in turn, makes it possible to arrange the ultrasonic transducers at a relatively close distance to one another, so that different objects may be particularly well differentiated from one another.

The present invention is based on the idea that the distance between two ultrasonic transducers or the ratio of the distances between at least three ultrasonic transducers is known and the known distance or the known distance ratio is taken into account during the detection of an actual signal propagation time of an ultrasonic transducer operated in the transmission mode in such a way that, in the case of a deviation of the actual setpoint propagation time from a setpoint signal propagation time (when the distance or the distance ratio between the ultrasonic transducers is known), the signal or the distance detected by the ultrasonic transducer operated in the receiving mode is provided with an appropriate correction value. The calibration of the ultrasonic transducers preferably takes place simultaneously with the object measurement, so that a separate calibration mode is not necessary.

Advantageous refinements of the method according to the present invention for calibrating ultrasonic transducers are described herein.

It is provided that the correction value is ascertained during every transmission cycle of the ultrasonic transducer operated in the transmission mode in order to be able to compensate for, or take into account, in particular during the operation of the ultrasonic transducer, fluctuating temperatures of the ultrasonic transducer, which set in, for example, during the operation. In other words, this means that a constant adaptation of the correction value of the ultrasonic transducer operated in the receiving mode takes place. As a result, a particularly precise distance measurement by the ultrasonic transducer takes place.

In order to be able to utilize all ultrasonic transducers provided in a system for the object measurement as well, it is important to also know the properties of the ultrasonic transducer initially operated exclusively in the transmission mode. In one further embodiment of the present invention, which makes it possible to reduce the number of ultrasonic transducers, it is therefore provided that at least one ultrasonic transducer, which is initially operated in the receiving mode, is subsequently operated in the transmission mode and, simultaneously, the ultrasonic transducer initially operated in the transmission mode is subsequently operated in the receiving mode, and, on the basis of the actual signal propagation time, the signal of the ultrasonic transducer operated in the receiving mode is provided with the first correction value.

The system of the different ultrasonic transducers involved in the distance measurement is not limited to the configuration in which the distances between the individual ultrasonic transducers are of equal length. Rather, it is also possible that the distances between at least three ultrasonic transducers are of different lengths. The different distances are taken into account, in this case, with the aid of setpoint signal propagation times of different durations.

The present invention also encompasses a system for carrying out the methods according to the present invention, which have been described so far, the system being distinguished by the fact that the system includes at least three ultrasonic transducers which are preferably not situated on a shared axis or straight line.

According to a first specific system, five ultrasonic transducers are present, two ultrasonic transducers being situated on either side of a central ultrasonic transducer in each case, and the two ultrasonic transducers situated on either side of the central ultrasonic transducer in each case lying on an axis, on which the central ultrasonic transducer is also situated. In such a system, the central ultrasonic transducer may be utilized for calibrating the ultrasonic transducers situated around it. Moreover, the central ultrasonic transducer is also utilized for the object and distance measurement.

In order to be able to reduce the number of required ultrasonic transducers, it is provided according to an alternative system that four ultrasonic transducers are provided, three ultrasonic transducers being situated on a shared (first) axis and the fourth ultrasonic transducer being situated above or beneath the shared (first) axis, and a (second) axis connecting the fourth ultrasonic transducer to the central ultrasonic transducer situated on the shared (first) axis being situated at a right angle to the shared (first) axis. In this case, it is provided that the middle (central) ultrasonic transducer situated on the (first) shared axis is additionally operated in the receiving mode, the fourth ultrasonic transducer then being operated, for example, in the transmission mode.

A system made up of ultrasonic transducers may be implemented in an even more cost-effective manner when the middle of the three ultrasonic transducers situated on the (first) shared axis is designed only as a transmitter. In this case, the propagation time correction results from the requirement that the azimuth position between an ultrasonic transducer on the edge and the central ultrasonic transducer on the (first) shared axis must be of the same size as the azimuth position between the central ultrasonic transducer and the other ultrasonic transducer on the edge.

A particularly cost-effective system based on the utilization of only three ultrasonic transducers is obtained when the three ultrasonic transducers are situated on corner points of an imaginary triangle connecting the three ultrasonic transducers, where the triangle is designed as a right triangle, preferably a right-angled isosceles triangle. In this case, it is necessary that two of the three ultrasonic transducers may be operated in the receiving mode as well as in the transmission mode.

Moreover, the placement of the ultrasonic transducers on a horizontal or vertical axis is not absolutely necessary. Rather, the correction of the gathered measured values of an ultrasonic transducer may also take place in a system of the ultrasonic transducers, in which the ultrasonic transducers are situated on a rotated or non-right-angled coordinate system. Moreover, it is mentioned that the propagation time correction or the determination of the two correction values may take place on the basis of a phase evaluation, a precise TOF (time-of-flight) measurement, or with the aid of a cross-correlation method according to the related art.

Further advantages, features, and details of the present invention result on the basis of the exemplary embodiments described below, and on the basis of the figures.

BRIEF DESCRIPTION OF THE DRAWINGS

Identical elements or elements having the same function are provided with the same reference numerals in the figures.

DETAILED DESCRIPTION OF EXAMPLE EMBODIMENTS

Figure 1:
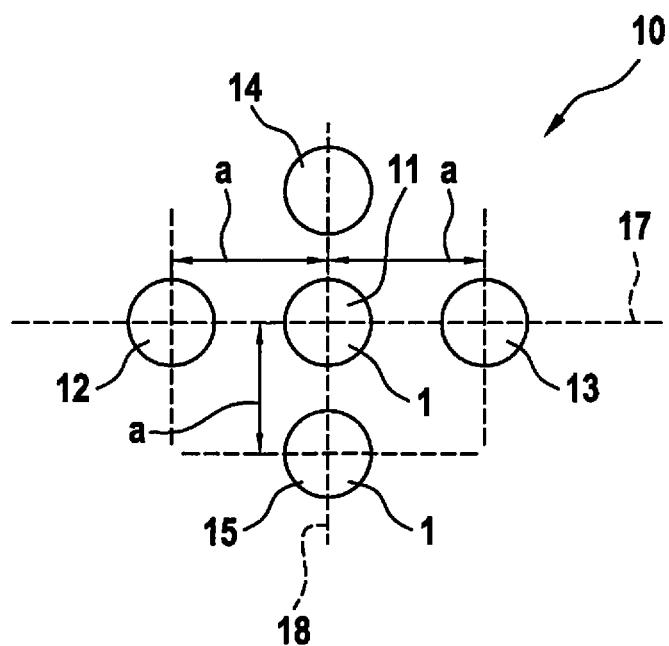
FIG. 1 through FIG. 4 each show highly simplified representations of different systems of ultrasonic transducers in accordance with the present invention.

FIG. 1 shows a first system 10 made up of five ultrasonic transducers 11 through 15, of the type which are situated, in particular, in the area of a bumper of a motor vehicle and are utilized for measuring the distance to an object. Ultrasonic transducers 11 through 15 are designed according to the related art, reference being made, by way of example, with respect to their design and mode of operation, to German Patent Application No. DE 10 2005 052 633 A1, which, in this regard, is expressly incorporated herein by reference in its entirety. Moreover, ultrasonic transducers 11 through 15 are coupled via a cable harness of the motor vehicle to a control unit (not represented).

Circular or cup-shaped, oscillatory diaphragm elements 1, which are represented in FIGS. 1 through 5, of the five ultrasonic transducers 11 through 15 are situated in the manner of a cross on two axes 17, 18 situated perpendicularly to one another, by way of example. Centrally situated ultrasonic transducer 11 is surrounded on both sides, on first axis 17, by second ultrasonic transducer 12 and third ultrasonic transducer 13. Moreover, fourth ultrasonic transducer 14 and fifth ultrasonic transducer 15 are situated on both sides of central ultrasonic transducer 11 on vertically situated second axis 18. By way of example, distances a between the center of diaphragm elements 1 of ultrasonic transducers 12 through 15 and central ultrasonic transducer 11 are all designed to have the same length.

In addition, distances a between ultrasonic transducers 11 through 15 may also be different. It is only essential that either particular precise distance a or the ratio of distances a between individual ultrasonic transducers 11 through 15 is known.

The four ultrasonic transducers 12 through 15 surrounding central ultrasonic transducer 11 have measuring inaccuracies during the detection of an object or the ascertainment of a distance to an object, which are production-induced, in particular due to different transient responses of ultrasonic transducers 12 through 15, and due to the operating temperature of particular ultrasonic transducer 12 through 15.

Figure 5:
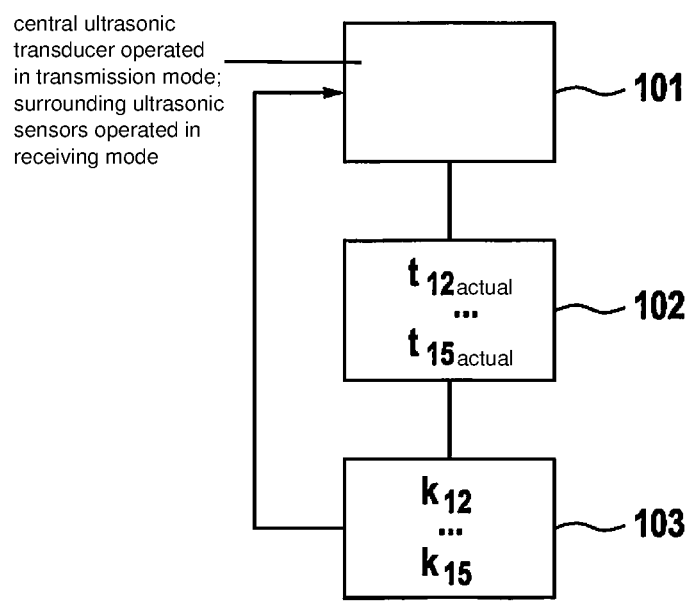
FIG. 5 shows a flow chart explaining the calibration method according to the present invention.

Reference is made in the following to the flow chart according to FIG. 5 with respect to the calibration of ultrasonic transducers 12 through 15 which, as is conventional, may each be initially operated in the transmission mode and, thereafter, in the receiving mode for the purpose of measuring the distance to an object. The calibration method for detecting and correcting the individual measuring inaccuracies of ultrasonic transducers 12 through 15 provides, in a first step 101, that central ultrasonic transducer 11 is operated in the transmission mode and the four ultrasonic transducers 12 through 15 surrounding central ultrasonic transducer 11 are operated in the receiving mode. Subsequently, after emission of the ultrasonic pulses by central ultrasonic sensor 11, four actual signal propagation times $t_{12actual}$ through $t_{15actual}$ are detected by the four ultrasonic transducers 12 through 15. Signal propagation times $t_{12actual}$ through $t_{15actual}$ result due to the speed of sound as well as distance a between ultrasonic transducers 11 through 15.

A sound of speed is assumed in this case, of the type which sets in at an (ambient) temperature of, for example, 15° C. Alternatively, the measured value of a vehicle's own temperature sensor, or the like, may also be utilized, in order to be able to more exactly determine the present speed of sound.

The production- or operation-induced, individual measuring inaccuracies of ultrasonic transducers 12 through 15 usually result in actual signal propagation times $t_{12}$ through $t_{15}$ which differ from setpoint signal propagation times $t_{12setpoint}$ through $t_{15setpoint}$. Actual signal propagation times $t_{12actual}$ through $t_{15actual}$ detected in second step 102 are subsequently provided, in a third step 103, with an individual correction value $k_{12}$ through $k_{15}$, respectively, by an algorithm in such a way that setpoint signal propagation times $t_{12setpoint}$ through $t_{15setpoint}$ result with consideration for correction value $k_{12}$ through $k_{15}$, respectively.

Setpoint signal propagation times $t_{12setpoint}$ through $t_{15setpoint}$ are correct for the case in which the exact speed of sound is known. If the exact speed of sound is not known or if a value for the speed of sound is assumed, the method is utilized for compensating for the measuring inaccuracies between individual ultrasonic transducers 12 through 15, in that, for example, given equal distances a between ultrasonic transducers 12 through 15, correction values $k_{12}$ through $k_{15}$ are calculated in such a way that identical signal propagation times $t_{12actual}$ through $t_{15actual}$ result. Similarly, provided the ratio of distances a between at least three ultrasonic transducers 12 through 15 is known, the method may be applied even without knowing precise distances a, in order to level the individual measuring inaccuracies of ultrasonic transducers 12 through 15. In the latter case, it is not necessary to know the speed of sound.

Figure 2:
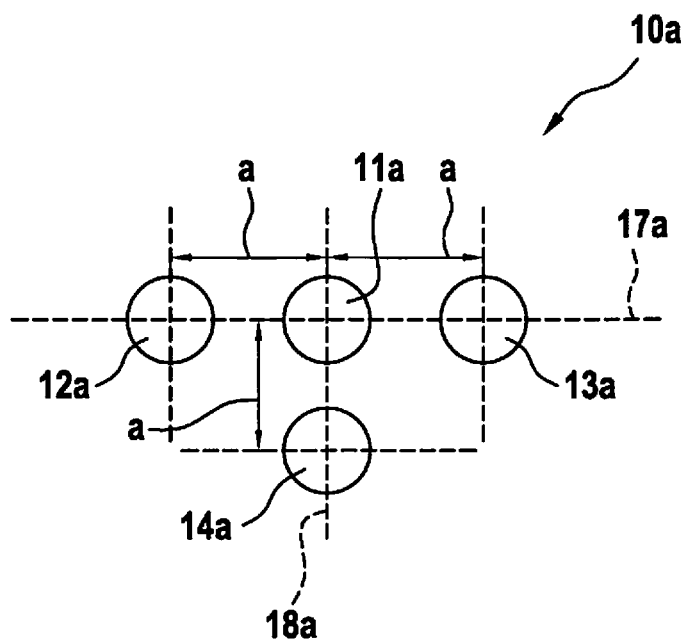

FIG. 2 shows a system 10a utilizing four ultrasonic transducers 11a through 14a. Central ultrasonic transducer 11a is surrounded on both sides, on a horizontal axis 17a, by the two ultrasonic transducers 12a and 13a, while ultrasonic transducer 14a is situated beneath central ultrasonic transducer 11a on vertical axis 18a. In the case of system 10a as well, it is assumed, by way of example, that distances a between ultrasonic transducers 11a through 14a are of equal lengths. System 10a differs from system 10 in that central ultrasonic transducer 11a may also be additionally operated in a receiving mode. In this case, it is necessary to also know the properties of central ultrasonic transducer 11a and to provide it with a correction value kn. For this purpose, for example, ultrasonic transducer 14a is operated in a transmission mode, while central ultrasonic transducer 11a is simultaneously operated in the receiving mode. Moreover, with respect to system 10, independently thereof, central ultrasonic transducer 11a is operated in a transmission mode and ultrasonic transducers 12a through 14a are operated in a receiving mode, in order to correct their individual measuring inaccuracies with the aid of correction value $k_{12}$ through $k_{14}$, respectively.

Figure 3:
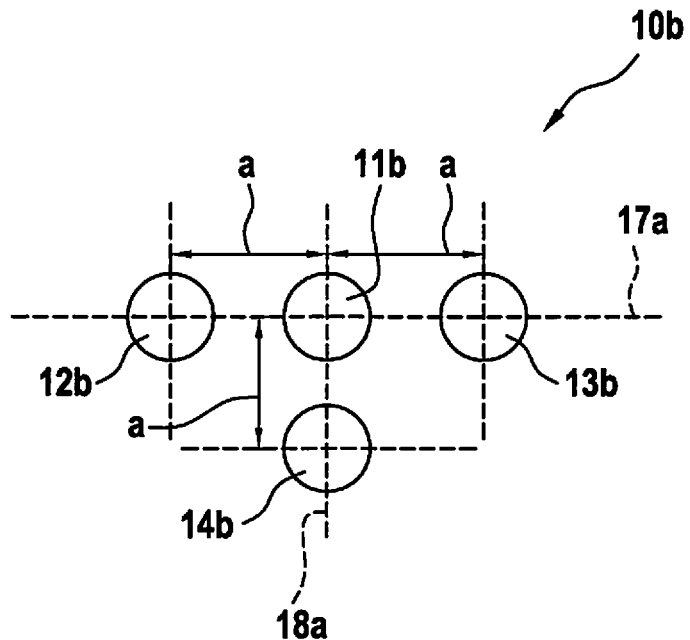

System 10b according to FIG. 3 differs from system 10a according to FIG. 2 in that only central ultrasonic transducer 11b is operated in the transmission mode, while the three other ultrasonic transducers 12b through 14b are each operated (exclusively) in the receiving mode, in order to ascertain correction values $k_{12}$ through $k_{14}$. System 10b may then be utilized when the azimuth position, which is ascertained on the basis of ultrasonic transducers 12b and 13b, is of the same size as the azimuth position ascertained on the basis of ultrasonic transducers 11b and 14b.

Figure 4:
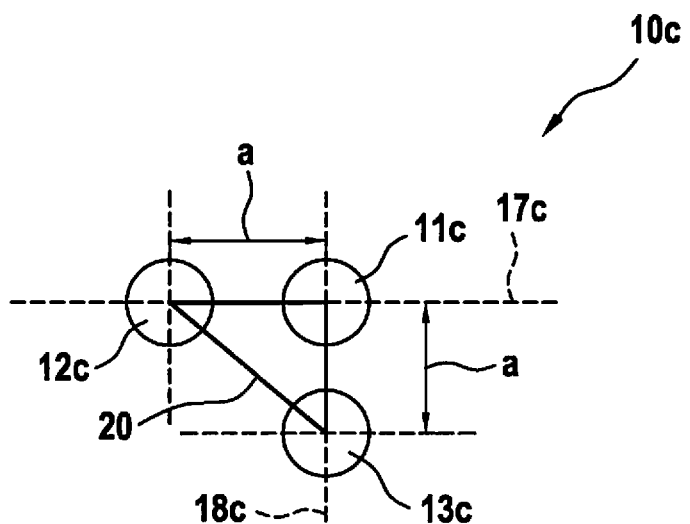

System 10c according to FIG. 4 encompasses only three ultrasonic transducers 11c through 13c. In this case, ultrasonic transducer 12c is situated on the left or laterally next to ultrasonic transducer 11c on a horizontal axis 17c, while ultrasonic transducer 13c is situated beneath central ultrasonic transducer 11c on a vertically situated axis 18c. The three ultrasonic transducers 11c through 13c form corner points of a right-angled isosceles triangle 20, where first ultrasonic transducer 11c and one of the two other ultrasonic transducers 12c, 13c may be operated in the transmission mode as well as in the receiving mode. The ascertainment of correction values $k_{11}$ through $k_{13}$ takes place by operating individual ultrasonic transducers 11c through 13c in the transmission mode and in the receiving mode, in alternation.

What is claimed is:

1. A method for calibrating ultrasonic transducers, the ultrasonic transducers being situated at known distances from one another or at known ratios of the distances from one another, the method comprising:
   operating at least one of the ultrasonic transducers in a transmission mode, and operating at least one other ultrasonic transducer in a receiving mode;
   determining at least one of a production induced or operation induced measuring accuracy of the ultrasonic transducer operated in the receiving mode based on (i) an actual signal propagation time, (ii) a known or assumed speed of sound, and (iii) the known distances or the known distance ratios between the ultrasonic transducer operated in the transmission mode and the ultrasonic transducer operated in the receiving mode; and
   as a function of the actual signal propagation time and the known or assumed speed of sound, providing a signal of the ultrasonic transducer operated in the receiving mode with a correction value.

2. The method as recited in claim 1, wherein the ultrasonic transducers are situated in a bumper of a motor vehicle.

3. The method as recited in claim 1, wherein the correction value is ascertained during every transmission cycle of the ultrasonic transducer operated in the transmission mode.

4. The method as recited in claim 1, wherein the ultrasonic transducer operated in the receiving mode includes at least two ultrasonic transducers operated in the receiving mode, each of the two ultrasonic transducers being situated in a vertical plane of and/or a horizontal plane on different sides of the ultrasonic transducer operated in the transmission mode, and the actual signal propagation times of the two ultrasonic transducers operated in the receiving mode on different sides of the ultrasonic transducer operated in the transmission mode are compared and are adapted taking into account the distances.

5. The method as recited in claim 1, wherein at least one ultrasonic transducer of the ultrasonic transducers initially operated in the receiving mode is subsequently operated in the transmission mode and, simultaneously, the ultrasonic transducer initially operated in the transmission mode is subsequently operated in the receiving mode and, on the basis of the actual signal propagation time, the signal of the ultrasonic transducer operated in the receiving mode is provided with the correction value.

6. The method as recited in claim 1, wherein different distances or distance ratios between at least three of the ultrasonic transducers are taken into account in the calculation of the correction values.

7. The method as recited in claim 1, wherein an ultrasonic transducer previously operated in the receiving mode is subsequently operated in the transmission mode in order to measure distances of objects.

8. The method as recited in claim 1, wherein the correction value is calculated taking into account a known speed of sound.

9. The method as recited in claim 1, wherein the correction value is calculated taking into account an assumed speed of sound.

10. A system for calibrating ultrasonic sensors, the system including at least three ultrasonic transducers situated at known distances with respect to or at a known distance ratio with respect to one another, the at least three ultrasonic transducers not being situated on a shared axis, the system configured to:

operate at least one of the ultrasonic transducers in a transmission mode, and operate at least one other ultrasonic transducer in a receiving mode;

determine at least one of a production induced or operation induced measuring accuracy of the ultrasonic transducer operated in the receiving mode based on (i) an actual signal propagation time, (ii) a known or assumed speed of sound, and (iii) the known distances or the known distance ratio between the ultrasonic transducer operated in the transmission mode and the ultrasonic transducer operated in the receiving mode; and as a function of the actual signal propagation time and the known or assumed speed of sound, provide a signal of the ultrasonic transducer operated in the receiving mode with a correction value.

11. The system as recited in claim 10, wherein the at least three ultrasonic sensors include five ultrasonic transducers, two of the ultrasonic transducers being situated on different sides of a central ultrasonic transducer in each case, and the two ultrasonic transducers situated on different sides of the central ultrasonic transducer in each case lying on an axis on which the central ultrasonic transducer is also situated.

12. The system as recited in claim 10, wherein the at least three ultrasonic transducers include four ultrasonic transducers, three of the ultrasonic transducers being situated on a shared first axis and a fourth one of the ultrasonic transducers being is situated above or beneath the shared first axis, a second axis connecting the fourth one of the ultrasonic transducers to a middle of the ultrasonic transducers situated on the shared first axis being situated at a right angle to the first axis.

13. The system as recited in claim 10, wherein the at least three ultrasonic transducers include three ultrasonic transducers which are situated on corner points of an imaginary triangle connecting the three ultrasonic transducers, and the triangle is a right triangle.

14. The system as recited in claim 13, wherein the triangle is a right-angled isosceles triangle.

* * * * *